(12) United States Patent
Grenet et al.

(10) Patent No.: US 11,381,745 B2
(45) Date of Patent: Jul. 5, 2022

(54) DRIFT CORRECTION WITH PHASE AND AMPLITUDE COMPENSATION FOR OPTICAL IMAGE STABILIZATION

(71) Applicant: InvenSense, Inc., San Jose, CA (US)

(72) Inventors: Pierre Grenet, Grenoble (FR); Sebastien Riccardi, Brezins (FR); Joe Youssef, Noyarey (FR)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/752,009

(22) Filed: Jan. 24, 2020

(65) Prior Publication Data

US 2020/0288061 A1    Sep. 10, 2020

Related U.S. Application Data

(60) Provisional application No. 62/815,326, filed on Mar. 7, 2019.

(51) Int. Cl.
| | |
|---|---|
| *H04N 5/232* | (2006.01) |
| *G06T 7/80* | (2017.01) |
| *G06T 7/20* | (2017.01) |

(52) U.S. Cl.
CPC ......... *H04N 5/23287* (2013.01); *G06T 7/20* (2013.01); *G06T 7/80* (2017.01); *H04N 5/2327* (2013.01); *H04N 5/23254* (2013.01); *H04N 5/23258* (2013.01); *H04N 5/23267* (2013.01); *G06T 2207/30244* (2013.01)

(58) Field of Classification Search
CPC .......... H04N 5/23287; H04N 5/23267; H04N 5/2327; H04N 5/23258; H04N 5/23254; G06T 7/80; G06T 7/20; G06T 2207/30244
See application file for complete search history.

(56) References Cited

U.S. PATENT DOCUMENTS

| | | | |
|---|---|---|---|
| 7,104,129 B2 | 9/2006 | Nasiri et al. | |
| 8,250,921 B2 | 8/2012 | Nasiri et al. | |
| 8,952,832 B2 | 2/2015 | Nasiri et al. | |
| 2010/0074605 A1* | 3/2010 | Washisu | ................ G03B 5/00 396/53 |
| 2012/0093493 A1* | 4/2012 | Wakamatsu | ....... H04N 5/23287 396/55 |
| 2012/0113280 A1* | 5/2012 | Stupak | .................. G03B 17/00 348/208.99 |
| 2015/0321903 A1 | 11/2015 | Lloyd et al. | |

(Continued)

*Primary Examiner* — Padma Haliyur
(74) *Attorney, Agent, or Firm* — DLA Piper LLP (US)

(57) ABSTRACT

Systems and methods of correcting for signal drift in optical image stabilization of a portable device. An accelerometer is used to obtain an acceleration signal corresponding to acceleration of the portable device. A gravity component is removed from the accelerometer signal to obtain a proper acceleration signal. A double integration is performed on the proper acceleration signal to obtain a translation signal. A drift component of the translation signal is estimated. The estimated drift component is used to generate a drift correction signal. A phase compensation signal is determined based on a plurality of phase responses of a plurality of components of the optical image stabilization system. The drift correction signal and the phase compensation signal are applied to an actuator controller which controls movement of a lens within the portable device as part of the process for optical image stabilization.

29 Claims, 10 Drawing Sheets

(56) References Cited

U.S. PATENT DOCUMENTS

2018/0220073 A1 8/2018 Keal
2019/0220073 A1 7/2019 Wu et al.
2020/0288060 A1 9/2020 Grenet

* cited by examiner

DRIFT CORRECTION WITH PHASE AND AMPLITUDE COMPENSATION FOR OPTICAL IMAGE STABILIZATION

CROSS REFERENCE TO RELATED APPLICATIONS

This application claims priority to Provisional Application Ser. No. 62/815,326 filed on Mar. 7, 2019, which is hereby incorporated by reference in its entirety.

The present invention generally relates to the field of imaging systems and methods, and more specifically, to imaging systems and methods having the ability to correct for movement of the imaging system during an image capture event.

BACKGROUND OF THE INVENTION

Imaging systems, such as still image cameras or video cameras, are commonly used to capture either a fixed (i.e., still) image or a series of images that make up a video sequence. With recent advances in technology and manufacturing, such cameras have been made smaller and cheaper. Additionally, the proliferation of electronic digital technology in recent years and decades, coupled with the continuing decrease in the cost of such digital technology and the cost of electronic memory, has resulted in widespread adoption and incorporation of digital cameras into various electronic devices. For example, video surveillance cameras for security and other applications typically incorporate digital cameras. Such cameras tend to be fixed in a particular position or orientation, and therefore, do not suffer from any imaging problems which may occur if the camera is shifted—even slightly—during the short period that each image is being captured.

In addition to being standalone devices, cameras—and in particular, digital cameras—have become common components or subsystems in many portable electronic devices. Foremost among these portable devices incorporating digital cameras are mobile or cellular telephones. Portable devices may also include devices incorporated into or intended to be used with cars or other transportation vehicle. In recent years, such mobile phones have developed to even include multiple cameras, oftentimes with one or more cameras on each "face" or side of the mobile phone, such that there are cameras pointing 180 degrees opposite each other to thereby capture images located on either or opposite sides of the mobile phone. The existence of a microprocessor, memory, housing and other components already needed to implement the various other features of the mobile phone, has resulted in a fairly small incremental cost for adding such camera functionality to the mobile phones.

Since the mobile phone is intended primarily as a handheld device, a problem begins to arise when the onboard camera of the mobile phone is used to capture an image while the mobile device is held in the user's hand. Despite a user's best intentions and efforts, virtually all users are unable to maintain their hand in a steady, fixed position while the image is being captured. Human users typically exhibit a slight hand movement or jitter (also referred to as hand tremor), which is a physiological phenomenon causing the user's hand to shake or move with low amplitudes at a relatively low frequency—typically at a frequency below 20 Hz. As mobile phones become lighter, the problem of jitter increases, since it is more difficult to hold steady a relatively lighter object.

The undesired result of such movement when using a camera is the introduction of picture blurring leading to decreased image quality. Fundamentally, this is due to the fact that the focusing lens within the camera positioned in the mobile phone is moving ever so slightly (user jitter) with respect to the fixed image being captured. This results in a smearing or blurring of the image, since there has now been introduced a relative movement between the object being imaged, the camera lens trying to focus the image, and the image sensor onto which the image is being focused, during the period of time or exposure that the camera lens is viewing the object or target. In addition, as camera quality increases and the number of pixels per image increases, the undesired effects of jitter become more noticeable, since a greater number of pixels may be affected.

One approach to addressing the undesired effects of jitter and hand tremor is the use of optical image stabilization. Broadly speaking, in optical image stabilization, a sensor is used to sense the jitter or movement of the camera, or device containing the camera, and an attempt is made to compensate for those unintended and unwanted movements by realigning the optical path by either moving the lens or image sensor. Optical image stabilization is usually not effective to compensate for gross movements or large scale movement, but rather only small scale movements of a user's hand (tremor) on the order of a few degrees of motion. One disadvantage of optical image stabilization is that additional hardware, such as sensors and the like, are required to be added, resulting in increased cost, weight, and size of the various mobile phones.

An alternative approach which has been developed to address jitter and hand movement in such applications, is electronic or digital image stabilization. A relative advantage of electronic image stabilization over optical image stabilization is that the former usually does not require the addition of new components. Instead, the approach of electronic image stabilization is to utilize complex algorithms and computations to analyze pixel and frame information and interpolate across an image or in between successive images to thereby "smooth out" any undesired changes. A relative disadvantage of this approach is the need for greater computational resources, as well as memory.

User movement when holding a camera can cause a misalignment between the focusing lens and the image sensor with respect to the image, as discussed above. In such a situation, the lens movement relative to the image may be different than the relative movement between the image sensor and the image since the lens and the image sensor are located at different positions within the mobile phone.

Optical image stabilization may be used to reposition the lens and/or the imaging sensor. Specifically, using the lens shift method, only the lens is moved using, for example, a small controlled motor or actuator, in order to realign the optical path to provide the image onto the correct, expected position with respect to the imaging sensor. Alternatively, the entire camera module (lens and sensor) may be moved in order to realign optically with the image being viewed.

An optical image stabilization system is used to detect vibration, control the camera components and thereby compensate for unwanted or unintended camera movement. The vibrations are typically sensed in at least two axes, i.e., the pitch direction (tilting down or up) and the yaw direction (tilting to the right or to the left). Different types of sensors may be used to detect motion depending on the particular implementation. Such sensors may be Hall effect sensors, photo reflectors, accelerometers, gyroscopes, and the like. The sensor information is used as input to calculate a desired shift or repositioning of the lens and/or image sensors, and this desired shift may be carried out by actuators and the like to move the lens and/or image sensors. The goal is to realign the optical path to the center of the image sensor and compensate for the motion of the user. This motion of the user may include rotational motion and/or translational motion.

Conventional optical image stabilization systems suffer from the fact that they are usually limited to compensation for rotational movement along 2-axes of movement, the pitch axis and the yaw axis. Although up to three rotational axes may be taken into consideration, the roll-axis is normally not compensated. Thus, such systems do not address non-rotational motion, i.e., vibration or unintended motion which is not of the form of rotation, but rather in the form of translational movement. One approach to also correct for translational movement is disclosed in applicant's co-pending application entitled "Translation Correction for Optical Image Stabilization" filed on even date herewith, which is incorporated by reference herein in its entirety. The co-pending application discloses an optical image stabilization approach which corrects for translational movement and also takes into account rotational movement.

Several challenges are faced when correcting for translational movement due to the fact that the translational movement is estimated based on a signal from an accelerometer sensor. To estimate translational movement from acceleration of the device, a double integration needs to be carried out. There are several factors that complicate the translational movement calculation based on accelerometer signals. First, the accelerometer measures the total acceleration, which is a combination of the gravitational acceleration and the proper acceleration of the device. The gravitational component of the acceleration can be determined based on the calculated orientation of the device. Any errors in the determined orientation influence the calculation of the gravitational acceleration, and thereby also influence the calculation of the proper acceleration of the device. Any errors in the determined proper acceleration of the device lead to errors in the determined translational movement. Furthermore, the accelerometer sensor signal includes some noise. Due to the (double) integration of the accelerometer signal, low frequency noise is amplified because integration amplifies low frequencies in a (1/f) relationship. These factors lead to errors in the calculated translational movement, and thereby to errors in the estimation of the position (change) of the device. The calculation of the translational movement may lead to errors, and these errors may increase over time. These errors are often referred to as drift, drift errors, or random walk, as they lead to an increased error between the calculated position and actual position over time.

Conventional approaches to solve the above described issue often try to obtain accurate translational movement estimates by trying to filter out all errors and noise of the accelerometer signal, thereby trying to get the best possible estimation of the proper acceleration of the device at the start of the calculations. However, it is generally not possible to utilize filtering to remove all such errors and noise. As discussed above, hand tremors or shaking are usually in the frequency band below about 20 Hz. The filtering should remove the undesired low frequency noise, but should not affect the acceleration signal of interest due to the hand motion, which is often not much higher in frequency. Very low frequency noise and DC signals within this band can be removed using a high pass filter. Furthermore, any filtering that is applied must take into consideration the required timing characteristics of the system, such as, e.g., the phase response of the actuators that move the lens based on the determined translational movement calculations. For example, while the filter needs to have a high cutoff frequency to ensure fast convergence, the cutoff frequency cannot be set as high as desired, since the filter still needs to pass the lower frequency signals of the sensor. Thus, there is a trade-off between the filter cutoff frequency and the phase response of the filter. As a result, using conventional methods it is very difficult to apply filtering techniques to remove all the undesired noise and error, while at the same time not affect the acceleration signal of interest and deliver the required phase response and timing characteristics. Therefore, with translational movement determination using these conventional techniques it is difficult to remove all drift errors.

There is thus a need for a solution that removes these unwanted drift errors in the translational movement signals based on accelerometer sensor signals, thereby correctly determining the position of the device. Although the discussion that follows focusses on the application of the use of accelerometers for the use in image stabilization, the invention may be used for any system or application where accurate linear/translational motion needs to be derived based on accelerometers.

SUMMARY OF THE INVENTION

In embodiments, the present invention is directed to an optical image stabilization system and method which also compensate for translation, in addition to rotation compensation which is included in conventional compensation techniques. This translation compensation may be performed for one, two or three axes, but is typically performed for two axes. The resulting compensation is typically referred to as four axis compensation—two axes rotation and two axes translation.

According to the present invention, a gyroscopic sensor is used to detect the angular velocity of the camera, or the angular velocity of the device within which the camera is positioned, such as a mobile telephone. From the angular velocity, the rotation of the device can be determined, such as for example, by integration. The gyroscopic sensor may be a two-dimensional sensor which provides angular velocity information along each of two different axes or dimensions. In this way, using the angular velocity information for each axis or dimension, a compensation or stabilization may be achieved in each of the two axes or dimensions based on a rotation movement of the camera or the camera-containing device.

Additionally, an accelerometer may be used to detect acceleration movement of the camera or the camera-containing device. This acceleration information may be used to determine translation movement of the camera or the camera-containing device. For example, a double integration of the acceleration information may be carried out to determine translation, or change in position. A two axis or two dimension accelerometer may be used to provide acceleration information along each of two different axes or dimensions. In this way, using the acceleration information for each axis or dimension, a compensation or stabilization may be achieved in each of the two axes or dimensions based on a translation movement of the camera or the camera-containing device.

In certain embodiments according to the present invention, the sensors used for the optical image stabilization may not be dedicated sensors for this purpose, but instead may be sensors located on a main circuit board of the mobile phone or camera-carrying device. The significance of this is that since such sensors may be located physically distant from the lens, then the translation information indicated by the sensors will be the translation experienced at the sensors, not necessarily the translation experienced by the lens, since the translation experienced by the board containing the sensors and the translation experienced by the lens may be different due to the physical separation between the two. In other words, the translation at the sensor may be different than the translation at the lens. To address this issue, a correction is applied to the sensor translation which takes into account the relative position between the sensor and the lens. This results in a corrected translation estimation which is more representative of the real translation at the lens.

The two axis rotation information and the two axis translation information may be utilized to determine an appropriate compensation in each of the axes or dimensions in order to compensate or correct for unwanted movement or positioning of the camera lens. This compensation information may be provided as input to control a motor or actuator which acts to move either the lens or the image sensor in order to control the optical path between the target (i.e., image) and the image sensor. In this way, the optical image stabilization system insures that the light arriving at the image sensor has not deviated from the expected trajectory, and also, no additional post processing algorithms or computations need to be performed on each frame of image data.

The compensation or stabilization process may be carried out continuously, or nearly continuously, as a function of time while the camera is active. In this way, the optical image stabilization system of the invention can detect and react to any camera movement while the camera is active.

In an embodiment, the present invention reduces the unwanted signal drift or undesired phase shift due to integration of the accelerometer sensor signal into the resulting translational movement signal. In discussing embodiments of the present invention, reference is made to phase and phase delay of a signal because in terms of time, the time delay is not the same for each frequency component in a signal band. Phase is a delay, either positive or negative, which is expressed as a fraction of the signal period multiplied by 360°, and can take on values between −180° and 180°.

According to an embodiment of the present invention, a correction is made for the drift which is experienced during the optical image stabilization process. The drift correction includes a correction for amplitude or translation shift. This is typically due to errors introduced by the integration process used to go from an acceleration signal output by the accelerometer, after correction for gravity, to a positional location. According to an embodiment of the present invention, a curve fitting approach is used to estimate the amount of translational shift, and this estimated translational shift is subtracted out from the positional or translation location information.

The drift correction also includes a phase compensation component which addresses the various contributions to phase delay from the different aspects or portions of the overall system. These individual phase components are assessed so a net amount of phase delay may be determined, such that an equal and opposite amount of phase delay may be introduced in order to bring the net phase delay to zero or close to zero or another desired level. These phase delay components include phase delay of the sensors used to detect the device motion, phase delay due to the algorithm which is engaged in order to compute the compensating phase, and phase delay due to the actuators (and associated controller) used to physically implement the lens correction in order to offset the undesired shaking or tremor induced lens motion. All of these phase delay components are taken into account in order to arrive at a zero or near zero overall phase delay. This phase correction is typically assessed once and the obtained values are used for subsequent operation. In other words, there is typically no need to carry out this assessment frequently or in real time.

In some embodiments, the present invention is directed to an optical image stabilization system and method which also compensate for translation, in addition to rotation compensation. An accelerometer may be used to detect acceleration movement of the camera which may be used to determine translation movement of the camera. In this way, using the acceleration information, a compensation or stabilization may be achieved in each axis based on a translation movement of the camera or the camera-containing device. In an embodiment, the present invention reduces the unwanted signal drift or undesired phase shift due to integration of the accelerometer sensor signal into the resulting translational movement signal. The various contributions to phase delay from the different aspects or portions of the overall system are assessed so a net amount of phase delay may be determined, such that an equal and opposite amount of phase delay may be introduced in order to bring the net phase delay to zero or close to zero. The system takes into account a phase delay component due to the actual motion of the lens (i.e., the shaking or tremor induced motion). There is also a phase delay due to the sensors used to detect the lens motion. In addition, there is a phase delay due to the algorithm which is engaged in order to compute the compensating phase. Finally, there is a phase delay component due to the actuators used to physically implement the lens correction in order to offset the undesired shaking or tremor induced lens motion. All of these phase delay components are taken into account in order to arrive at a zero or near zero overall phase delay.

BRIEF DESCRIPTION OF THE DRAWINGS

The above and still further objects, aims, features, aspects and attendant advantages of the present invention will become clear to those of ordinary skill in the art from a consideration of the following detailed description of embodiments presently contemplated for carrying out the principles of the invention, including alternative embodiments and implementations, taken in conjunction with the accompanying figures, in which.

DETAILED DESCRIPTION OF ILLUSTRATIVE EMBODIMENTS

Figure 1:
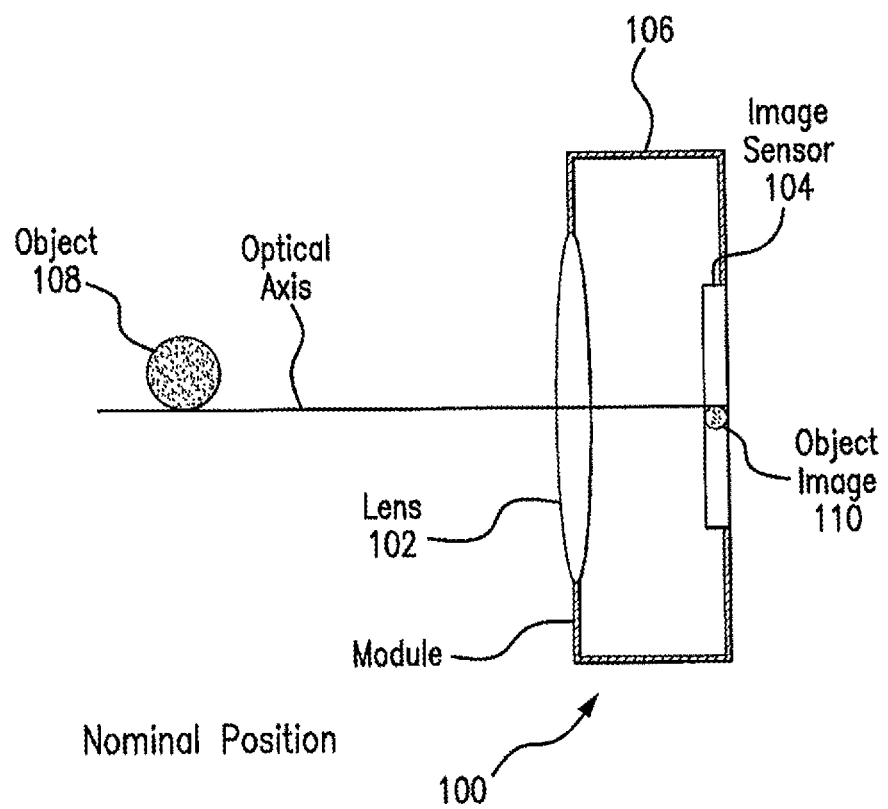
FIG. 1 is an illustration of a lens and image portion of a camera when in the normal position.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU/SPU and a microprocessor, a plurality of microprocessors, one or more microprocessors in conjunction with an MPU/SPU core, or any other such configuration.

As noted above, it is increasingly desirable to provide a mobile electronic device with one or more digital cameras. Correspondingly, it is also desirable to provide OIS systems to improve the image quality produced by such cameras. Conventionally, an OIS module may comprise motion sensors, such as gyroscopes and accelerometers, dedicated for the OIS. In particular, one or more functions associated with OIS may be performed by hardware and/or processing resources that are provided independently of a camera unit. For example, a mobile device may have a gyroscope and/or other suitable motion sensor that performs functions unrelated to OIS. Notably, a mobile device may employ motion sensors as part of the user interface, such as for determining orientation of the device to adjust the display of information accordingly as well as for receiving user input for controlling an application, for navigational purposes, or for a wide variety of other applications. Data from such a sensor may be used to determine motion of the mobile device for OIS so that the camera unit does not require a dedicated motion sensor. As will be appreciated, the user interface functions may not be required during image recording or the motion sensor may be able to perform both functions (as well as others) simultaneously. Further, a processor or processing resources utilized for other functions in the mobile device, such as processing the sensor data, may be employed to perform tasks associated with OIS, reducing or removing the need to provide dedicated OIS processing on the camera unit. Such architecture designs allow for a simplified camera unit, as well as facilitating manufacture and calibration.

In describing certain embodiments of the invention illustrated in the drawings, certain specific terminology will be used for the sake of clarity and explanation. However, the invention is not intended to be limited to the particular specific terminology, and it is to be understood that the terminology used herein includes all equivalents that operate in a similar manner to accomplish the same or similar result.

Referring now to FIG. 1, therein is illustrated a relevant portion of a camera assembly 100 including a lens 102, image sensor 104, and housing 106. In FIG. 1, the camera assembly 100 is not moving with respect to the object 108 being viewed. As a result, the image 110 of the object 108 is properly positioned on the image sensor 104 after passing through lens 102. It should be noted that the object image 110 is essentially "upside down" as it appears on the image sensor 104, but this is due to the optical behavior of lens 102 as is commonly known and understood in conventional optics. The lens 102 is used to obtain and focus optical information corresponding to the image onto the image sensor 104, which in turn converts the optical image information into electrical image information for subsequent storage, display, or the like, as is conventionally known.

Figure 2:
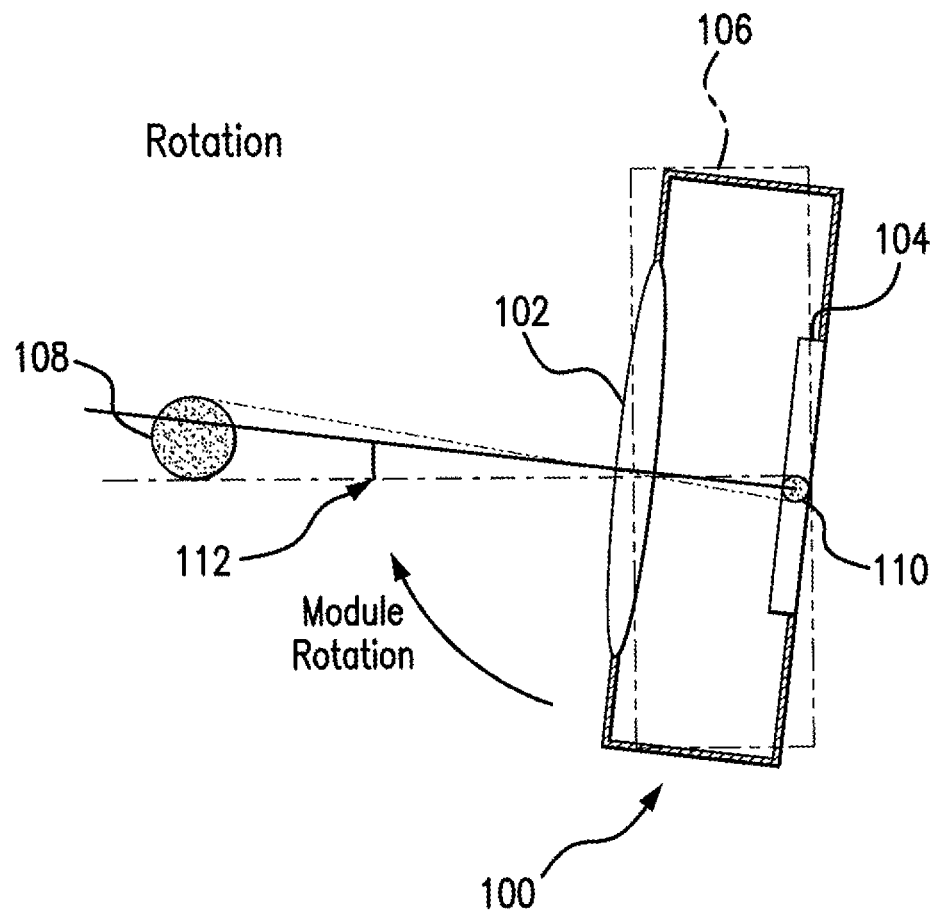
FIG. 2 is an illustration of a lens and image portion of a camera when the camera is in a rotated position.

FIG. 2 illustrates the camera assembly 100 in a position where it has undergone a small clock-wise rotation 112 with respect to the object 108. The rotation is essentially a tilt or angular movement about an axis of the camera assembly 100. As a result, the image 110 of the object 108 will effectively shift on the sensor 104 by an amount based on the amount of rotation. The effect of this will be that the object 108 will appear to have moved, and when this "movement" takes place during the exposure time during which the sensor 104 is used to image the object 108, then the image 110 recorded by the sensor 104 will appear to have been stretched, or blurred. When this movement takes place during video recording, the object 108 seems to have moved, while in fact the object 108 did not move. FIG. 2 illustrates a rotation about one axis, but the effect is essentially the same when the rotation is about another of the camera's axes which is orthogonal to the one illustrated in FIG. 2.

Figure 3:
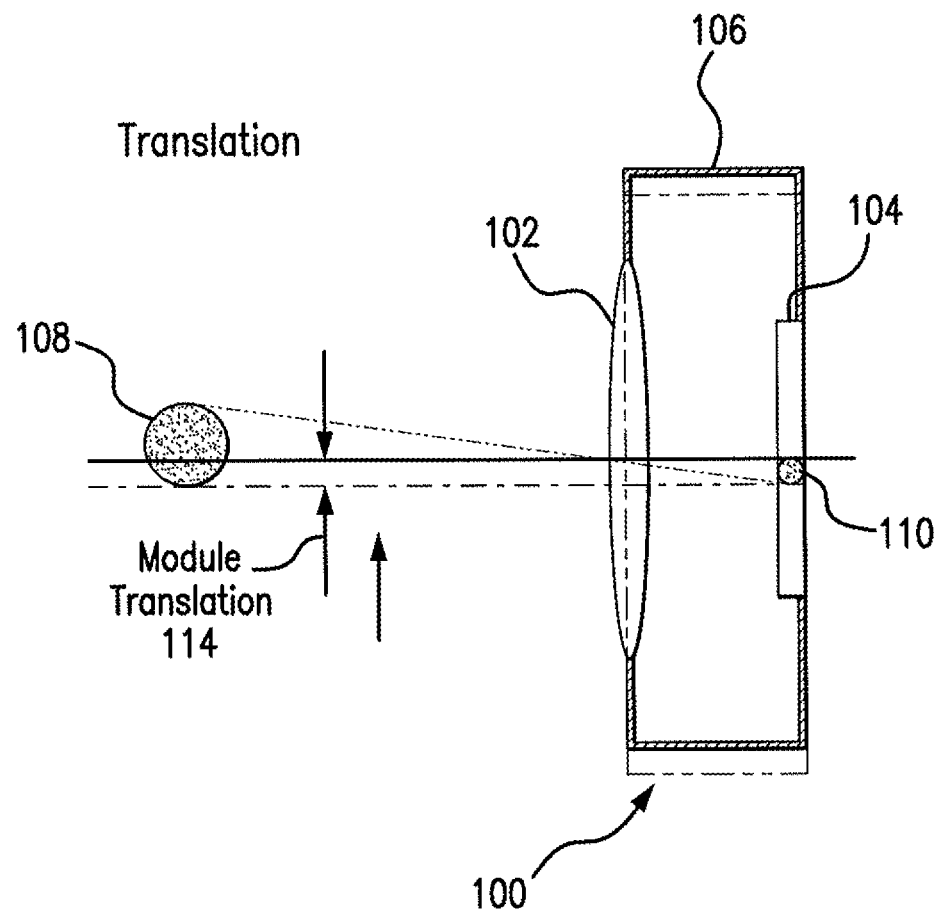
FIG. 3 is an illustration of a lens and image portion of a camera when the camera is in a translated position.

FIG. 3 illustrates the camera assembly 100 in a position where it has undergone a translation 114 with respect to the object 108. The translation is essentially a linear movement along one axis or dimension of the camera assembly 100. As a result, the image 110 of the object 108 will be effectively shifted with respect to the image sensor 104. As with the rotation effect discussed above, the effect of this will be that the object 108 will appear to have moved, and when this "movement" takes place during the exposure time during which the image sensor 104 is used to image the object 108, then the image 110 recorded by the image sensor 104 will appear to have been stretched, or blurred. FIG. 3 illustrates a translation along one axis, but the effect is essentially the same when the translation is along another of the camera's axes which is orthogonal to the one illustrated in FIG. 3. In addition, when there is translation movement along multiple axes, the net translation movement of the assembly 100 may appear to be in a diagonal direction, but the diagonal movement is simply made up of individual linear translations, each one along one of the multiple axes or dimensions.

Figure 4:
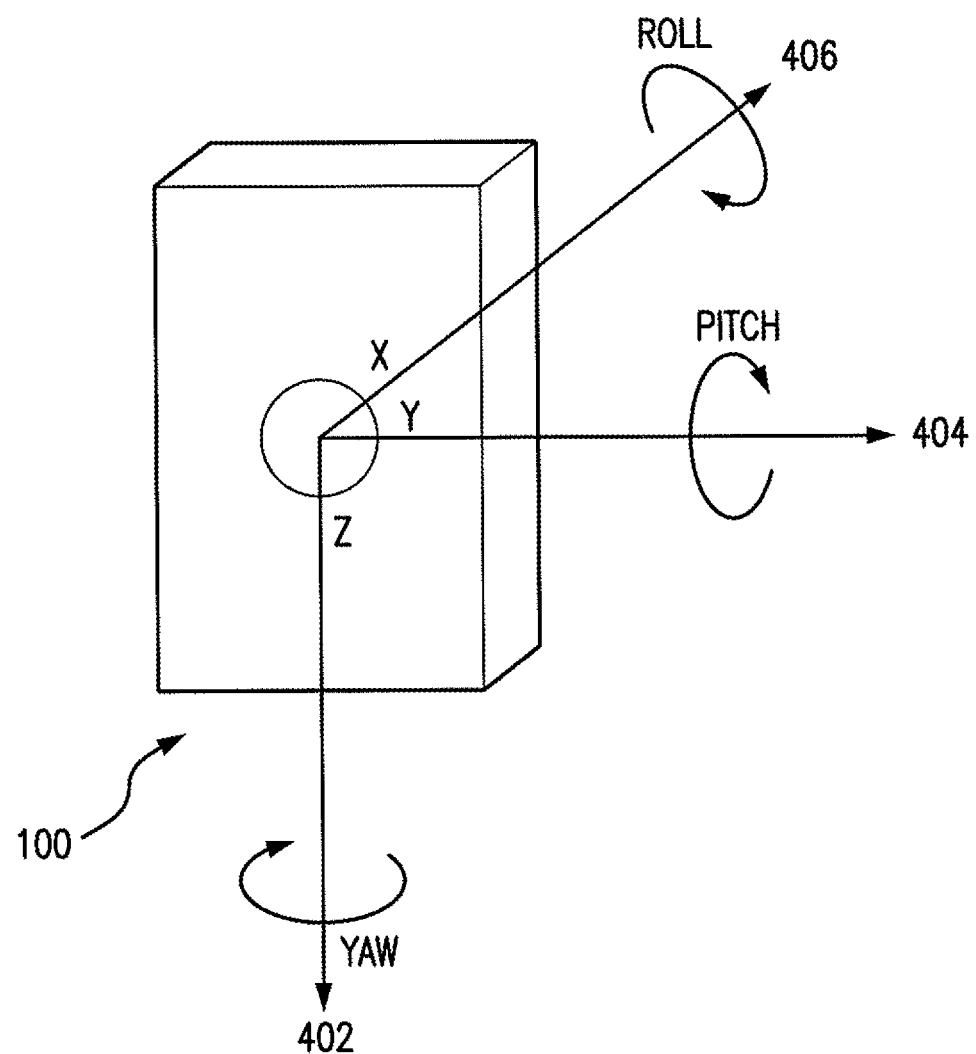
FIG. 4 is a perspective view of the different axes of rotation with respect to an object.

FIG. 4 illustrates the camera assembly 100 and indicates the three different axes or dimensions for reference purposes in connection with describing rotation movement. The three axes, 402, 404, and 406 are each orthogonal to each other. Rotation about axis 402 is referred to as yaw, rotation about axis 404 is referred to as pitch, and rotation about axis 406 is referred to as roll. In an x-y-z frame of reference, the x-axis may correspond to roll, the y-axis may correspond to pitch, and the z-axis may correspond to yaw.

Figure 5:
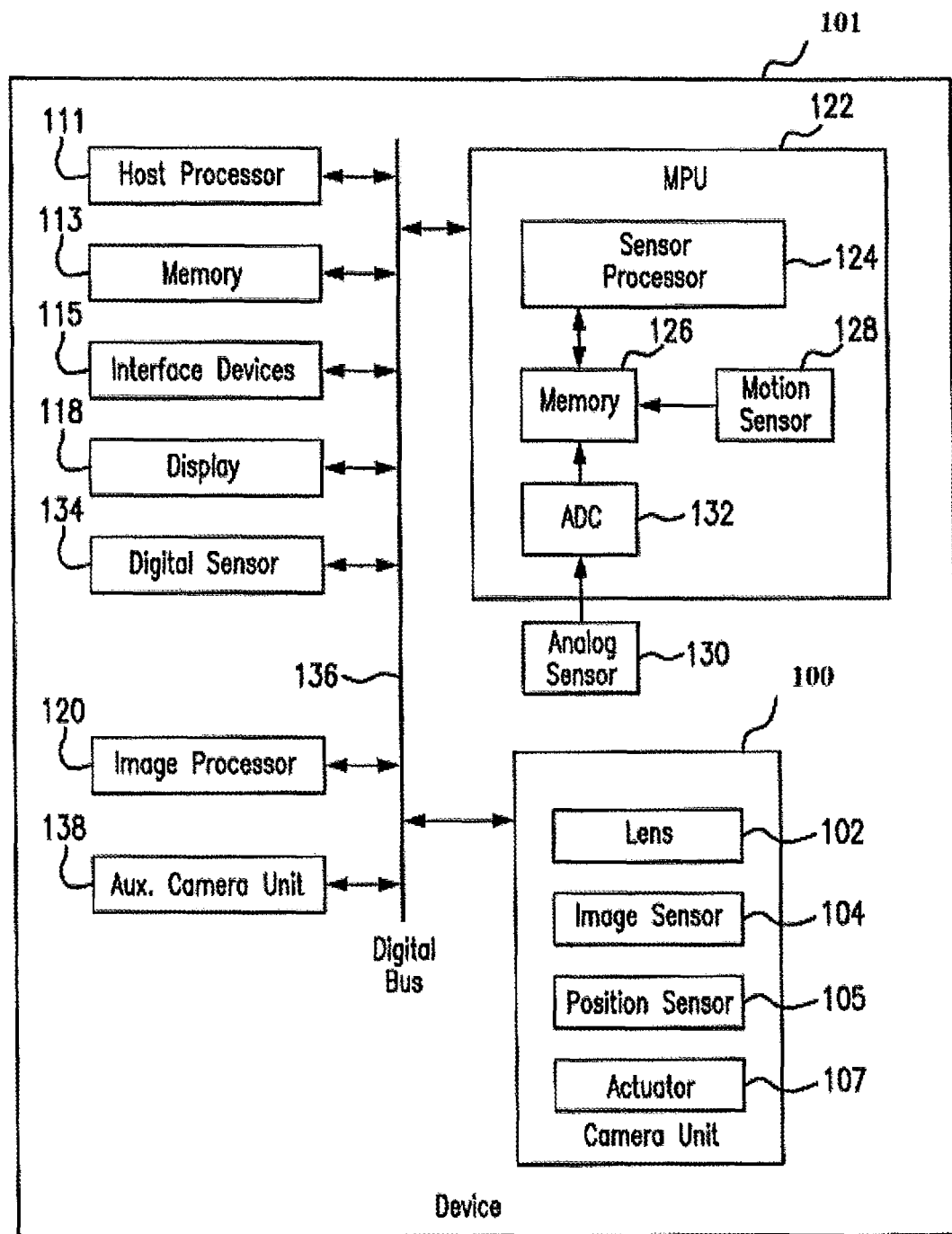
FIG. 5 is a block diagram of an optical image stabilization system according to an embodiment of the present invention.

FIG. 5 shows a block diagram of an optical image stabilization system according to an embodiment of the present invention. As shown in FIG. 5, the optical image stabilization system may be included as part of a handheld device 101 or a device that is secured to a user. Such a device may be a smartphone, tablet, laptop, personal digital assistant (PDA), video game player, video game controller, navigation device, mobile internet device (MID), personal navigation device (PND), portable music, video, or media player, remote control, or other handheld device, or a combination of one or more of these devices.

As shown, camera unit 100 includes lens 102, image sensor 104, actuator 107 (which may also optionally include a controller for directing the motion of the actuator) for imparting relative movement between lens 102 and image sensor 104 along at least two orthogonal axes, and position sensor 105 for determining the position of lens 102 in relation to image sensor 104. In one aspect, actuator 107 may be implemented using voice coil motors (VCM) or using piezoelectric actuators and position sensor 105 may be implemented with Hall sensors, although other suitable alternatives may be employed. The handheld device 101 may also include a host processor 111, memory 113, interface devices 115 and display 118. Host processor 111 can be one or more microprocessors, central processing units (CPUs), or other processors which run software programs, which may be stored in memory 113, associated with the functions of the handheld device. Interface devices 115 can be any of a variety of different devices providing input and/or output to a user, such as audio speakers, buttons, touch screen, joystick, slider, knob, printer, scanner, computer network I/O device, other connected peripherals and the like. Display 118 may be configured to output images viewable by the user and may function as a viewfinder for camera unit 100. Further, the embodiment shown features dedicated image processor 120 for receiving output from image sensor 104, although in other embodiments this functionality may be performed by host processor 111 or other processing resources.

Accordingly, multiple layers of software can be provided in memory 113, which may be any combination of computer readable medium such as electronic memory or other storage medium such as hard disk, optical disk, etc., for use with the host processor 111. For example, an operating system layer can be provided for the handheld device to control and manage system resources in real time, enable functions of application software and other layers, and interface application programs with other software and functions of the handheld device. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single handheld device, and in some of those embodiments, multiple applications can run simultaneously.

The handheld device 101 also includes integrated Motion Processing Unit (MPU) 122 featuring sensor processor 124, memory 126 and motion sensor 128. MPU 122 may also be included within camera unit 100. Memory 126 may store algorithms, routines or other instructions for processing data output by motion sensor 128 and/or other sensors as described below using logic or controllers of sensor processor 124, as well as storing raw data and/or motion data output by motion sensor 128 or other sensors. Motion sensor 128 may be one or more sensors for measuring motion of the handheld device in space. Depending on the configuration, MPU 122 measures one or more axes of rotation and/or one or more axes of acceleration of the device. In one embodiment, at least some of the motion sensors are inertial sensors, such as rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 124 or other processing resources of the handheld device provides a six-axis determination of motion. As desired, motion sensor 128 may be implemented using MEMS to be integrated with MPU 122 in a single package. Exemplary details regarding suitable configurations of host processor 111 and MPU 122 may be found in U.S. Pat. Nos. 8,250,921 and 8,952,832, which are hereby incorporated by reference in their entirety. Further, MPU 122 may be configured as a sensor hub by aggregating sensor data from additional processing layers as described in U.S. Patent Publication No. 2015/0321903, which is also hereby incorporated by reference in its entirety. Thus, MPU 122 is configured to provide motion data for purposes independent of camera unit 100, such as to host processor 111 for user interface functions, as well as enabling OIS functionality.

The handheld device 101 may also include other sensors as desired. As shown, analog sensor 130 may provide output to analog to digital converter (ADC) 132 within MPU 122. Alternatively or in addition, data output by digital sensor 134 may be communicated over digital bus 136 to sensor processor 124 or other processing resources in the handheld device. Analog sensor 130 and digital sensor 134 may provide additional sensor data about the environment surrounding the handheld device 101. For example, sensors such as one or more pressure sensors, magnetometers, temperature sensors, infrared sensors, ultrasonic sensors, radio frequency sensors, or other types of sensors can be provided. In one embodiment, data from a magnetometer measuring along three orthogonal axes may be combined with gyroscope and accelerometer data to provide a nine axis determination of motion. Further, a pressure sensor may be used as an indication of altitude for the handheld device, such that a sensor fusion operation may provide a ten axis determination of motion. In the context of the OIS techniques of this disclosure, any combination of sensors, including motion sensor 128, analog sensor 130 and digital sensor 134, all of which may be implemented independently of camera unit 100, may be used to determine angular velocity and/or translational movement of the handheld device along at least the two orthogonal axes associated with the plane of image sensor 104.

In the embodiment shown, camera unit 100, MPU 122, host processor 111, memory 113 and other components of the handheld device 101 may be coupled through digital bus 136, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of the handheld device 101, such as by using a dedicated bus between host processor 111 and memory 113.

As noted above, multiple layers of software may be employed as desired and stored in any combination of memory 113, memory 126, or other suitable location. For example, a motion algorithm layer can provide motion algorithms that provide lower-level processing for raw sensor data provided from the motion sensors and other sensors. A sensor device driver layer may provide a software interface to the hardware sensors of the handheld device 101. Further, a suitable application program interface (API) may be provided to facilitate communication between host processor 111 and MPU 122, for example, to transmit desired sensor processing tasks. Other embodiments may feature any desired division of processing between MPU 122 and host processor 111 as appropriate for the applications and/or hardware being employed. For example, lower level software layers may be provided in MPU 122 and an API layer implemented by host processor 111 may allow communication of the states of application programs as well as sensor commands. Some embodiments of API implementations in a motion detecting device are described in U.S. Pat. No. 8,952,832, incorporated by reference above.

Additionally, the handheld device 101 may include a plurality of digital imaging modules, each of which may implement OIS utilizing general purpose motion sensing and/or processing capabilities according to the techniques of this disclosure. For example, handheld device 101 may include auxiliary camera unit 138. Although not shown for the purposes of clarity, one of skill in the art will appreciate that auxiliary camera unit 138 may include sufficient assemblies for OIS, such as actuators, position sensors and the like as described in the context of camera unit 100 or the other camera units of this disclosure. In one embodiment, handheld device 101 may be a smartphone, in which case camera unit 100 may be configured as a rear-facing camera and auxiliary camera unit 138 may be configured as a front-facing camera. In other embodiments, any suitable number of camera units may utilize the motion sensing capabilities of the handheld device to implement OIS.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS cap provides mechanical support for the MEMS structure. The MEMS structural layer is attached to the MEMS cap. The MEMS cap is also referred to as handle substrate or handle wafer. In the described embodiments, an MPU may incorporate the sensor. The sensor or sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments the first substrate may be disposed laterally and electrically connected to the second substrate in a single semiconductor package.

As one example, the first substrate may be attached to the second substrate through wafer bonding, as described in U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Depending on the context, motion data may refer to processed raw data, which may involve applying a sensor fusion algorithm or applying any other algorithm. In the case of a sensor fusion algorithm, data from one or more sensors may be combined to provide an orientation of the device. In the described embodiments, an MPU may include processors, memory, control logic and sensors among structures.

As discussed above, when correcting for translational movement using an accelerometer sensor, there is typically a noise associated with the accelerometer sensor signal, and the low frequency components of the noise are amplified due to the (double) integration. Such noise cannot be freely or easily filtered out because it is not possible to filter out all low frequency noise signals without affecting the signal of interest due to the hand tremor and noise both being relatively low frequency. Furthermore, filtering at too low of a frequency will also result in too much phase lead and will be problematic for the phase response of the system. Additionally, the accelerometer sensor measures two types or components of acceleration; one of these is gravity and the other is the device's proper acceleration, and it is the latter acceleration that it is desired to obtain for subsequent calculations. In order to isolate the device's proper acceleration, gravitational acceleration is first estimated based on the determined orientation (using e.g., sensor fusion with data from different sensors) and then subtracted from the accelerometer signal, with the result being the desired device acceleration. Methods to determine the proper acceleration based on device orientation and e.g., sensor fusion are well known to the person or ordinary skill in the art.

The novel method proposed here differs from conventional methods in that this method does not try to filter out all the noise and errors from the accelerometer signal before performing integration, which as explained above is complicated and often will not result in the required accuracy. Rather, this novel method aims to model the drift and position estimation errors in the translational movement signal due to the noise and errors in the accelerometer signal, and then correct the translational movement signal for the noise based on the modeling. The translational movement signal can then be used to determine the position (change) of the device, and required position correction by the image stabilization system.

Figure 6:
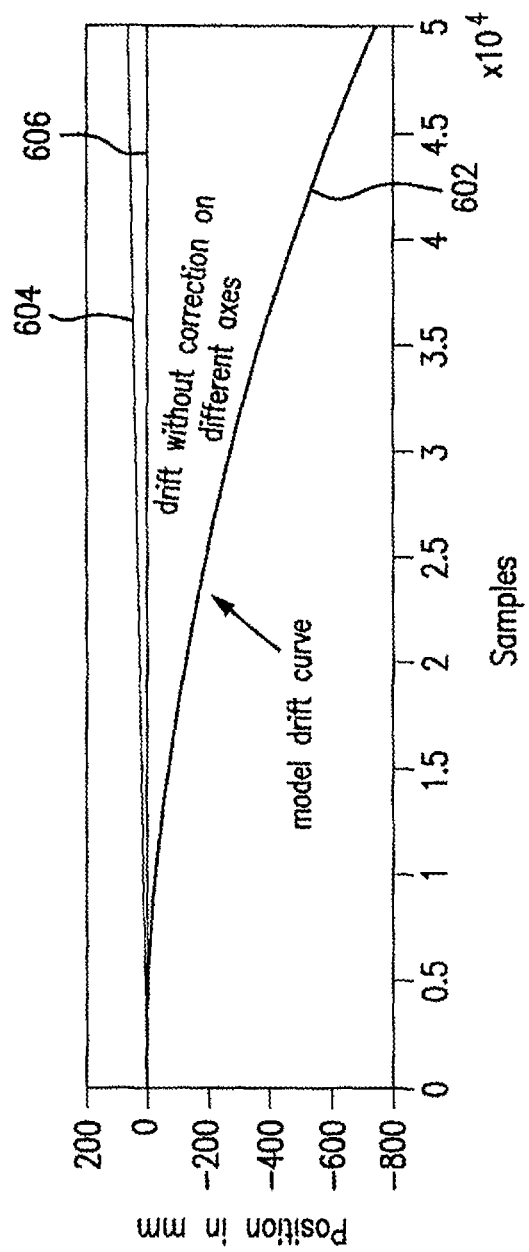
FIG. 6 is a time graph of a translational change in position as a function of time without any drift correction.

Referring now to FIG. 6, therein is illustrated a time graph of the calculated translational change in position as a function of time. The change in position is obtained by way of double integration of the accelerometer signal (correction for the contribution of gravity). This change in position over time includes both the effects of the actual hand tremor or shaking, as well as the drift over time due to the integration error from the accelerometer sensor signals. FIG. 6 shows three translational position curves, 602, 604, and 606, each corresponding to one of the x-y-z coordinate axes. The horizontal axis of the graph shows the number of samples being taken at a rate of 1 kHz. Each of these curves is made up of essentially two components, one is the translational change in position due to hand tremor or shaking, and the other component is the error in the translational position calculation due to the noise, referred to as drift. As shown in FIG. 6, for the illustrated exemplary plot, there is relatively little translational change in position over time for curve 606; however, curves 602 and 604 exhibit a translational change in position on the order of 60 mm and 700 mm, respectively, after 50 seconds of position calculation.

Figure 7:
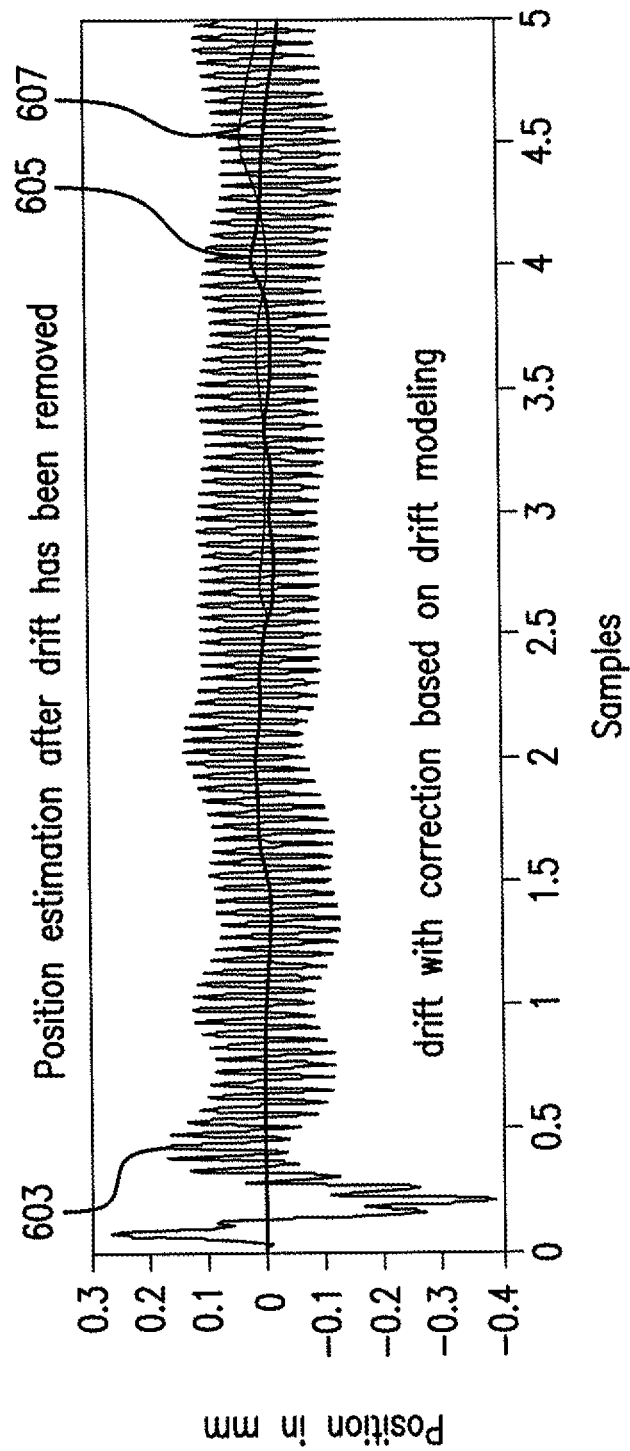
FIG. 7 is a time graph of the translational change in position of FIG. 6 with the application of drift correction.

As discussed above, each of these curves, in particular curve 602, includes both a tremor/shaking component and a drift component. Often, the drift component is relatively large with respect to the tremor/shaking components such that the former obscures the latter, and this situation is illustrated in FIG. 7. Referring now to FIG. 7, therein is illustrated curves 603, 605, 607 which respectively represent the tremor/shaking component for curves 602, 604, 606 of FIG. 6. The curves 603, 605, 607 of FIG. 7 are obtained by removing (or compensating for) the drift component in each of curves 602, 604, 606 by applying the methods proposed here. In order words, curves 603, 605 and 607 represent the correctly determined translation motion of the camera unit. The drift correction is performed by modeling the drift curves 602, 604, 606, and subtracting the modeled drift curves from the measurement curves obtained, for example, by way of double integration of the accelerometer signal. What remains is the tremor/shaking component, which is the information of interest that is used for the image stabilization. As can be seen in FIG. 7, the tremor/shaking component 603 is somewhat sinusoidal in shape and has an amplitude on the order of 0.1 to 0.2 mm. Such a small signal was essentially obscured and not visible in FIG. 6 due to the fact that the corresponding drift component was orders of magnitude larger, ranging to several hundred mm.

Figure 8:
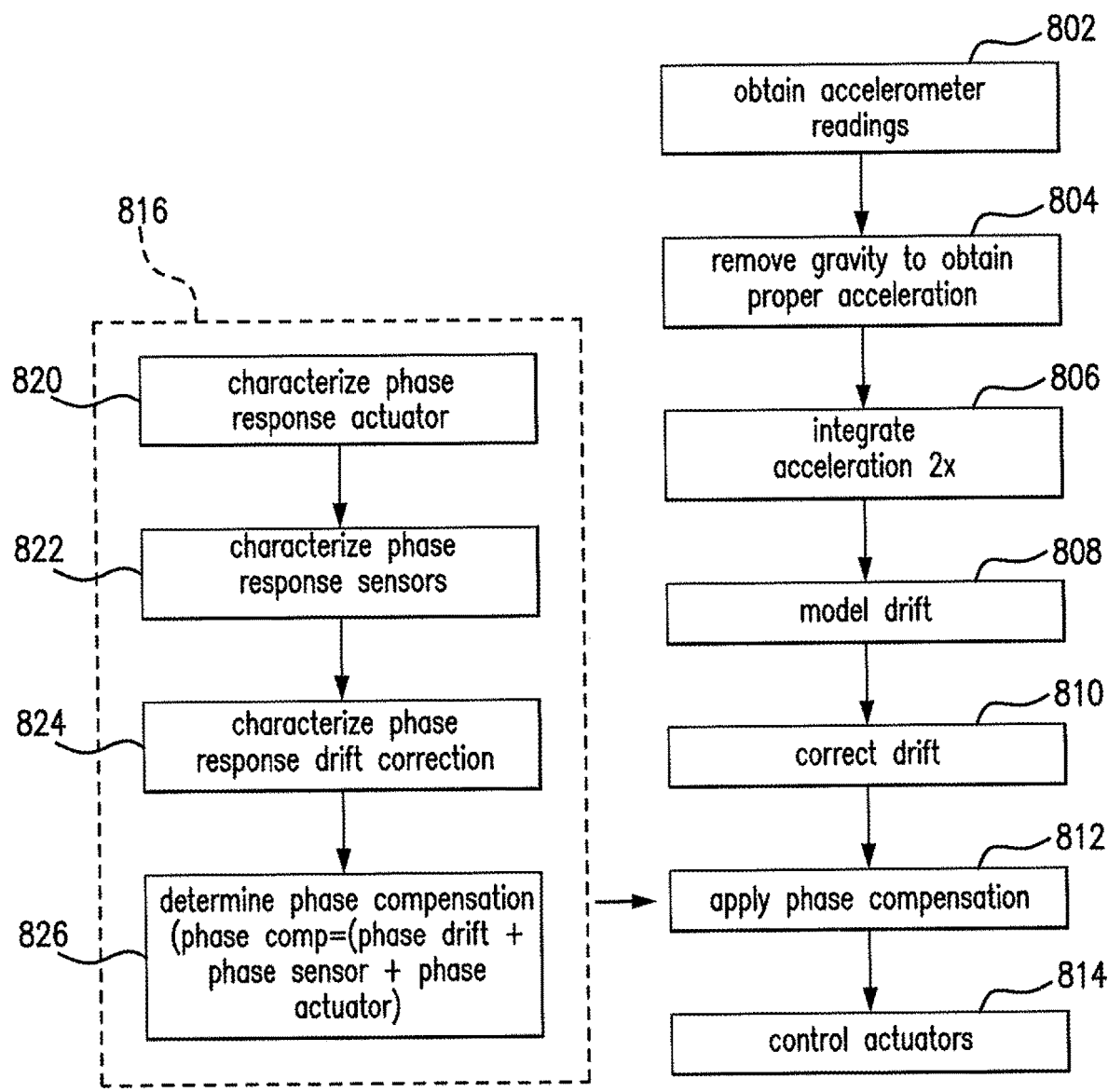
FIG. 8 is a flowchart showing an embodiment of drift correction including phase compensation and translation correction according to an embodiment of the present invention.

Referring now to FIG. 8, therein is illustrated a flowchart of a method of drift correction according to an embodiment of the present invention. As discussed above, the translational movement correction has two different components, a first component that determines the amplitude of the drift and drift correction, and a second component that makes sure the timing characteristics and phase compensation of the system are as required. For an efficient image stabilization system, the position of the lens and/or image sensor is corrected based on the determined motion, and this means that the lens and/or image sensor must be at the correct position at the right time. To achieve correct timing for applying the position correction, the timing characteristics of the entire system must be known and understood, including the sensor, algorithm and actuators. Because the timing and delays of the different components, such as, e.g., the correction algorithm and the actuators, depend on the frequency (of the motion), the timing and delays are often expressed in terms of phase or phase delays. Any timing correction the system may apply may therefore be referred to as a phase compensation. The phase compensation requires a phase characterization or phase calibration to understand the phase response of the different parts of the system. These phase characterization steps or processes may only be carried out once, or alternatively, a few times—but less frequently than the nearly continuous curve-fit approach for determining the amplitude of the drift. These less frequent processes are collectively referred to as phase response characterization 816, and include characterizing the phase response of the actuator (step 820 (Phase_actuators)), characterizing the phase response of the sensors (step 822 (Phase_sensors)), characterizing the phase response of the drift correction algorithm (step 824 (Phase_algo)), and then the step of taking into account all of these determined phase responses (step 826), in order to arrive at the overall phase compensation which is to be applied to the overall system (step 812) to make sure the timing of the system is correct.

The algorithm for drift correction begins at step 802 by obtaining the accelerometer readings. The accelerometer readings may be from a plurality of axes, and the drift correction may be performed for one or more axes. As discussed above, the accelerometer readings may contain noise and errors (e.g., bias/sensitivity errors). Next, at step 804, the acceleration component due to gravity is removed in order to obtain the true or proper acceleration. This proper acceleration is then integrated twice (step 806), in order to determine position, or change in position (translational motion) information. Note that because of the limitation of not being able to filter out all the noise and offsets, the determined position in step 806 contains errors, and these errors increase over time, which is the drift. The outcome of step 806 corresponds, for example, to the position curves of FIG. 6. This position information is then used (step 808), to model or estimate the amplitude portion of the drift. The modeling includes curve fitting the position as a function of time. It is important to note that the assumption here is that the device is not being moved intentionally, so the position of the device does not change over time, and that the only motion imparted to the device is due to hand tremor or other types of jitter and vibrations. Based on this assumption, this means that the low frequency continuous behavior of the position curves (as in FIG. 6) is due to the errors in the calculation, while the high frequency position variations superposed on this is due to hand tremor. (Note that when talking about high frequencies, this refers to frequencies higher in the band of possible tremor frequencies, so in general still below about 20 Hz). The modeling or curve fitting therefore, is done for the continuous variation of the curve below the tremor frequencies. This estimated drift amplitude based on the curve fitting is then used in the drift correction (step 810). This correction includes subtracting the modeled position/drift curve (from step 808) from the calculated positions output at step 806. This results, for example, in the curves shown in FIG. 7 where only the frequency component of the tremor vibrations remain. It is exactly these position variations due to the hand tremor that the OIS system corrects for by moving the lens using the actuators. Next, the overall phase compensation obtained at step 826 is applied (step 812) in order to make sure the actuator input has the correct phase response and the timing of the system is correct so that the lens and/or image sensor is at the right position at the right time for optimum image stabilization. Continuing to step 814, the translational motion signal, which has now been corrected for drift errors and has the correct phase response, is applied as input to the various actuators to move the lens and/or image sensors relative to each other to achieve better image stabilization. The drift correction algorithm may be implemented for each axis for which drift is to be corrected.

Figure 9:
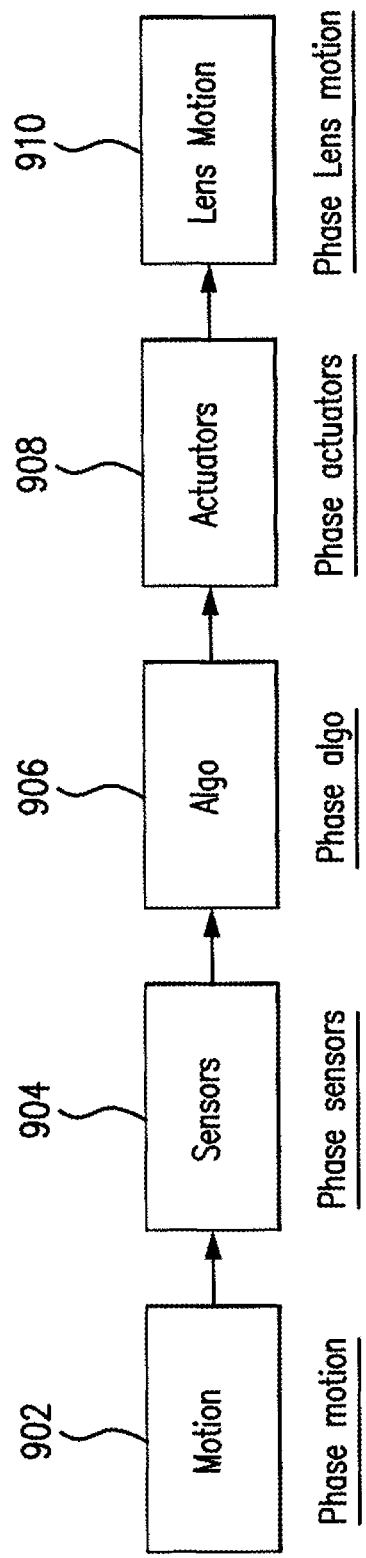
FIG. 9 is a block diagram showing the various elements of phase and phase compensation according to an embodiment of the present invention.

Referring now to FIG. 9, therein is illustrated a functional block diagram of the various phase responses and phase delays/leads associated with the various aspects or components of the system. Phase delay means a positive phase response, while phase lead means a negative phase response. The sensors and actuators may introduce a phase delay and the algorithm may introduce a phase lead. (Note that the convention of negative and positive could be inverted). The system has certain delays throughout the different stages or steps because the different stages take time. For example, it takes time to measure and output the accelerometer data, it takes time to process the algorithm, and it takes time to move the actuators. Because these different delays often depend on the frequency of the motion, the delays can be dealt with in terms of phase (delays). Therefore, the discussion below is in terms of phase and phase delays/leads, which often has a frequency dependence. In general, in an embodiment according to the present invention, the various components or portions of the overall optical image stabilization system which each introduce phase delay (or lead) are considered individually and together so that the individual phase delays (or lead) may be taken into account in order to arrive at an overall system phase delay (or lead) that ensures the correct timing characteristics of the image stabilization. The general concept is that the phase behavior of the motion imparted to the device by the user (902) is identical to the phase of the lens motion (910) to ensure proper timing of the image stabilization. In other words, the phase response of the system should be such that the motion of the lens cancels out the motion of the device.

First, Phase_motion 902 represents the phase associated with the movement or displacement of the device as a result of the slight hand movement or jitter of the person holding, for example, a mobile phone with an integrated camera having a lens. In general, it is this movement which is sought to be compensated for or cancelled by the optical image stabilization system.

Next, Phase_sensors 904 represents the phase delay due to the internal operation of the various motion sensors. In other words, this is the phase delay corresponding to the time that it takes the motion sensors to provide a digital output indicating the detected motion, and includes such components as the delay in the analog-to-digital (A/D) converters within the sensors. This sensor phase delay is generally a fixed parameter, and is often characterized in advance, either by the device manufacturer or through calibration or manufacturing testing.

Figure 10:
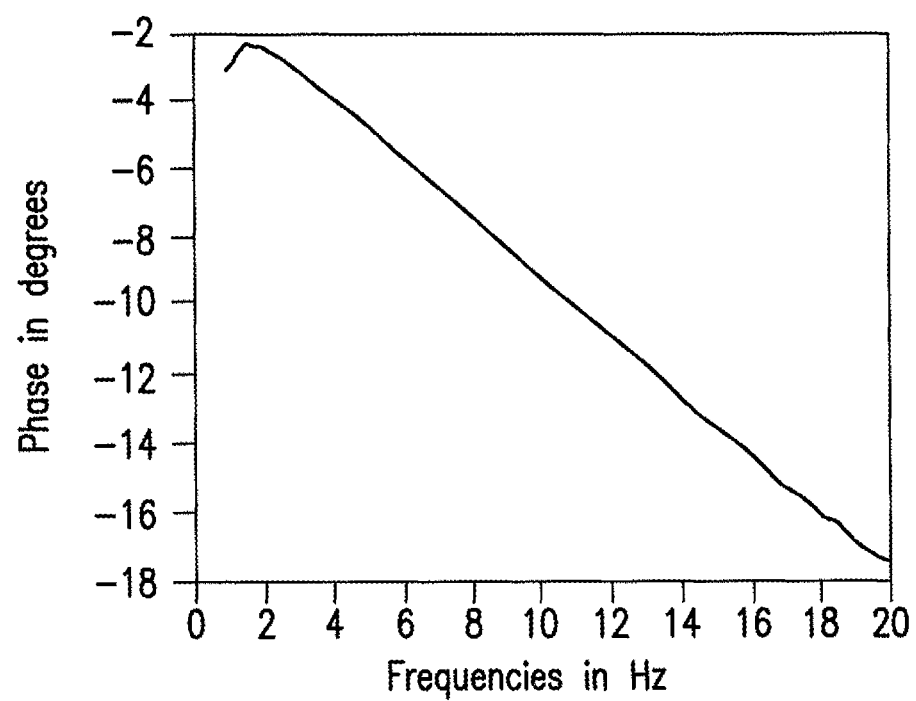
FIG. 10 is a graph of phase delay as a function of frequency for an embodiment of the optical image stabilization algorithm.

The next phase component which is considered is Phase_algo 906 which represents the phase change through the various computational blocks used to implement the algorithm of the optical image stabilization. The algorithm actually contributes a phase lead. This algorithm implements various filtering mechanisms, which each have a certain phase response. The phase response of the algorithm can be characterized by inputting signals with different frequencies and then measuring the delays between the input and output in terms of a phase difference. The characterization or calibration then provides an indication of delay or phase delay as a function of frequency. This is shown in FIG. 10. As shown in FIG. 10, phase delay due to the translational motion estimation and drift correction algorithm may be characterized for a range of input frequencies. This phase component is typically negative, meaning a phase lead.

The next phase delay component which is considered is Phase_actuators 908 which represents the phase delay due to the physical nature of the operation of the various actuators used to move the lens and/or image sensor to thereby adjust the relative position of the lens with respect to the image sensor. This phase delay component is due primarily to the inertial delay inherent in achieving actuator motion, and is typically dependent on acceleration and/or change in direction experienced by the actuator, as well as the frequency of the signal applied to the actuator. Similar to the phase characterization of the algorithm, a calibration procedure is performed inputting signals of different frequencies and determining the delay of the actuators. This then gives the phase delays or phase response of the actuators as a function of the frequency. This phase delay component is typically characterized in advance for a particular actuator device. Moreover, the phase response of the actuators can be taken into consideration when designing the actuators, meaning that the design of the actuators is adapted to produce a certain desired phase response. If the phase response of the actuators is not known, the system as a whole can be calibrated when the algorithm phase tuning is done with the entire system in the loop.

The purpose of optical image stabilization is to move the lens in the opposite direction of the camera movement, so that the optical path with respect to the image being viewed remains unaffected by the motion. This means that the motion imparted to the lens should be identical, but opposite to the motion of the device. (Depending on convention, it can be stated that the phase should be identical, but the amplitude of motion inverted, or that the amplitude is identical, but the phase is in opposition). This means that in FIG. 9, phase_motion 902 should equal phase_lens_motion 910. This also means that the phase delays of the sensors, algorithm and actuators should cancel each other out, because if they do not, then phase_motion 902 and phase_lens_motion 910 do not match. Therefore, taking into account all the phase delay components discussed above leads to the following relationship:

$$\text{Phase\_algo} = -\text{Phase\_sensors} - \text{Phase\_actuators} \quad (1)$$

The phase response of the sensors and the actuators cannot be changed, so the phase response of the algorithm should be adapted in order to satisfy Equation 1.

Phase_sensors is fixed or constant and has a positive value. Phase_actuators is also fixed or constant and also has a positive value. As a result, Phase_algo is the only variable which can be controlled and should take on a negative value in order to achieve the overall system timing and compensation which is desired. This is also an advantage in that the present solution may be used with many different types of actuators without requiring any change or modification to the actuator. Rather, Phase_algo is used to provide any needed compensation or adjustment. The phase response of the drift compensation as discussed above may not equal phase_algo, which means that an additional phase compensation must be determined within the algorithm (step 826). The additional phase compensation serves the purpose of adapting the phase response without altering the amplitude. For example, the additional phase compensation may be achieved using a combination of low-pass and high-pass filters, and positive or negative time delays. In step 812 the phase compensation is applied so that Equation 1 is satisfied. This means that the control signal for the actuators is determined taking into consideration the phase response of the actuator so that in the end the phase of the lens motion 910 equals the phase of the motion of the device 902.

The various phase characterizations of the different components, e.g., the phase component of Phase_algo or Phase_sensors or Phase_actuators, do not need to be calculated repeatedly or in real time. Rather, they are typically calculated or determined once at the beginning of the execution of the algorithm, or may be determined in a factory (or at an earlier stage) and stored on the device. Alternatively, they may be calculated at shorter or longer intervals, as desired. In yet another alternative, they may be calculated only once, and then these initial determinations are used for all subsequent calculations.

Referring back now to FIGS. 6 and 7 and the drift curve fitting, and as discussed above, the translational motion and position as determined and shown in FIG. 6 includes the hand tremor signal of interest and the position error that increases over time, i.e., the drift. The left side of the figure ($t_0$) represents the start of the algorithm and the start of the integration. The time $t_0$ may, for example, correspond to the time when the camera application is started, when the accelerometer sensor is activated, or when the user presses a button to take one or more photos or start a video. At this time the curve fitting may also start. The curve fitting is done continuously, meaning the curve fitting takes into consideration new samples and performs the curve fitting from to up to and including the new sample. The curve fitting may be done for every new sample (at the sample rate) or every few new sample or at a fixed time interval (e.g., every 10 ms, 20 ms, 50 ms, 100 ms, . . . ) Any suitable curve fitting techniques may be used. For example, one curve-fitting approach may incorporate a linear function of $\{1, t, t^2, t^3,$ etc.$\}$. In one embodiment the curve fitting uses at least a second order or higher type of curve fitting. The type and order of curve fitting used may depend on the required accuracy and the available resources. After every curve fitting, the translation motion data may be corrected using the curve fitting data, resulting in data as shown in FIG. 7.

The curve fitting is continuously updated using new data points. This means that the curve fitting is done over an increasing amount of data point. Moreover, adding more and more data points may increase the accuracy of the curve fitting. Therefore, the curve fitting window size may be limited to a certain time range and number of data points. In order to extend the curve fitting beyond the limits of the curve fitting window, a plurality of sequential curve fitting windows may be used. In one embodiment, when reaching the limit of a first curve fitting window, a second curve fitting window may be started. In another embodiment, a second curve fitting window may be started before the end of the first curve fitting window is reached, so that the windows overlap to a certain extent (e.g. 50% or 90%). In the overlapping region, the translation motion results may be a (weighted) average of the simultaneously applied curve fitting windows. Using overlapping windows may also overcome potential less accurate results at the start of the curve fitting process, as is visible in FIG. 7, where at the start of the window the correction is less accurate. For this reason, a number of samples may be processed at the beginning, but not used, in order to properly initialize the system.

The correction algorithm and curve fitting window(s) may be initiated by various triggers. As mentioned above, the trigger may be the start of a camera application of a mobile phone, or the user pressing a button to focus the camera or to start capturing an image. In order to avoid initialization errors, the curve fitting may be continuous once an application is started, and then a photo trigger or button press may be used to center the position of the lens based on the last position estimates. This avoids the lens position reaching its limits. In other words, the system will apply the described algorithm so that at the start of the photo exposure, the lens will be in an optimum position to allow maximum motion (compensation) during the exposure time. The trigger may also be a certain instant in the image acquisition. For example, a trigger could be the end of an intentional motion (i.e., motion necessarily larger than tremor motion), or it could be assumption of motion that is only tremor-related motion. In one embodiment, for example, when a plurality of images is taken, as part of a series of images or a video, the start of each image may trigger the algorithm and/or curve fitting. In another embodiment, the trigger may be a section of an image, so that a plurality of windows are used for a single image capture. This may be beneficial for longer exposure times, and may therefore be selectively applied based on the camera settings. The algorithm may have a trigger input that determines the start of the algorithm or curve fitting based on a received trigger signal from the camera unit, or other part of the system (e.g. host processor). The trigger signal may be activated when the camera is turned on, or based on the state of the photo capture button (as discussed above). The trigger button may also be used to trigger the continued execution of (parts of) the algorithm. For example, the algorithm may (pre-)process the accelerometer data, but may not yet do anything else. In another example, the algorithm may already determine the proper acceleration, but may only start the integration process when the trigger is received. In yet another example, the algorithm may perform the integration, but may only start the curve fitting once the trigger signal is received.

In some embodiments of the invention, it is also possible to perform the algorithm and principles of the invention in a layered or multi-level method. For example, a first level correction may be formed using a less accurate curve fitting method (e.g. lower order), and this may be applied to the image stabilization to limit the drift (e.g. making sure the limits of the actuators are not reached). This enable the OIS system to be always on without the drift becoming too large, which may make the actuator reach the limits. When needed, for example as indicated using a trigger signal, a second level correction may be applied, which has a high accuracy because it is using more advanced curve fitting or a higher data rate. The second level algorithm may run on top of the first level algorithm, meaning it corrects errors not corrected by the first level, or the second level algorithm may take over from the first level algorithm.

As discussed above, the principle of the drift correction is based on the assumption that the hand tremor or jitter is the only motion, and that the user is not intentionally moving the camera. This means that the system may check if the user is moving the camera intentionally or not. When it is determined that intentional movement is detected, the algorithm may be stopped, and possible and alternative algorithms may be started, which are not based on the same assumption. This means that the camera may have an image stabilization algorithm for periods of unintentional motion, and an image stabilization algorithm for periods of intentional motion. The latter may be less accurate and have poorer performance, since the camera is moving in any case. The detection of intentional movement may be based on the accelerometer data itself, for example, when the acceleration exceeds a certain threshold. Alternatively, the determination of intentional movement may also, or in addition, be done using additional sensors, such as, e.g., other motion sensors or proximity sensors, or may be done using image analysis, where the change of image/scene may be used as an indication of intentional motion.

The image stabilization which is achieved may not be fully desirable. The estimation of the hand tremor motion and the drift correction may not achieve a particular level of accuracy, and therefore the image stabilization mechanism may have an evaluation module to determine if the image stabilization should be applied or not. The evaluation module may estimate if the image stabilization algorithm is likely to improve or degrade the image quality. For example, the evaluation module may estimate the performance of the drift correction and the likelihood and/or amplitude of any residual drift or position error. Based on this estimation the image stabilization may be applied, or not. For example, the drift compensation may be characterized by a certain level of motion attenuation, and based on the determined motion amplitude (or other characteristic), it may be decided if application of the compensation algorithm is beneficial or not. The system may have a requirement that application of the compensation algorithm should have a certain amount of motion attenuation. If the system determines the requirement cannot be met, the compensation is not activated. The algorithm may compare the possible remaining drift or position error with the amplitude of the hand tremor, and based on this comparison turn the image stabilization on or off. For this comparison the algorithm may determine a quantity of motion of the user hand tremor, and compare this quantity to a performance estimation of the drift correction algorithm. The performance of the drift correction may be based on an analysis of the remaining drift components in the corrected translation signal (e.g., using frequency analysis). The algorithm performed may be evaluated continuously, for example, based on the estimated quality of the curve fitting or the correction results. The algorithm may be applied for a certain amount of time, or it may be applied until the increased drift estimation gets to a level such that it is decided to stop the stabilization (or start another curve fitting window). Alternatively, the algorithm performance specification may be known, and when the user motion is small (e.g., relative to a motion threshold), the comparison with the performance specifications may be used to make a decision to turn the OIS on or off. The camera settings may also influence the decision to switch the OIS on or off. For example, the exposure time of the image capture process may influence the decision. Since the drift increases over time, it may also be assumed that the possible error of the drift correction can increase over time. This means that for longer exposure images, the drift correction may be less effective, and may even lead to a decrease in image quality, compared to if no correction is applied. This means that for longer exposure images, the image stabilization may be turned off from the start, or may be used only for a certain time and stopped during the remainder of the image capture process. Thus, the decision to apply the correction mechanism depends on the evaluation of the correction performance (possibly in combination with performance requirements), the actual quantify/amplitude of the user's hand tremor, and the characteristics of the image capture process.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed:

1. A method of correcting for signal drift in an optical image stabilization system of a portable device, comprising:
   using an accelerometer to obtain an acceleration signal corresponding to acceleration of the portable device;
   removing a gravity component from the accelerometer signal to obtain a proper acceleration signal;
   performing a double integration on the proper acceleration signal to obtain a translation signal, the translation signal including a device movement component indicating device movement and a drift component, the drift component representing errors introduced to the translation signal during the double integration due to errors in the acceleration signal from the accelerometer;
   estimating the drift component of the translation signal, responsive to obtaining the translation signal;
   applying the estimated drift component to generate a drift correction signal such that the drift correction signal can be applied to the translation signal to minimize the drift component of the translation signal and maximize the device movement component of the translation signal;
   determining a phase compensation signal of the optical image stabilization system, based on a plurality of phase responses of a plurality of components of the optical image stabilization system; and
   applying the translation signal, after correction by the drift correction signal, and the phase compensation signal to an actuator controller which controls movement of a lens within the portable device as part of an optical image stabilization process, such that the translation signal is used to control the correct amplitude of the movement of the lens, and the phase compensation signal is used to control the correct timing of the movement of the lens.

2. The method of claim 1, wherein the step of estimating the drift component comprises curve fitting the obtained translation signal.

3. The method of claim 1, wherein the step of applying the drift correction signal comprises subtracting the drift correction signal from the translation signal.

4. The method of claim 2, wherein the curve fitting is performed using a predetermined time window.

5. The method of claim 2, wherein the curve fitting is performed using a plurality of overlapping time windows.

6. The method of claim 2, wherein the curve fitting is performed for at least two orthogonal axes of motion for the portable device.

7. The method of claim 1, wherein the step of estimating the drift component is responsive to a trigger signal.

8. The method of claim 7, wherein the trigger signal indicates at least one of a user input, a start of a camera application of a mobile phone, and a start of an image capture.

9. The method of claim 1, wherein the plurality of phase responses comprises a phase response of an actuator.

10. The method of claim 1, wherein the plurality of phase responses comprises a phase response of the accelerometer.

11. The method of claim 1, wherein the plurality of phase responses comprises a phase response of the step of applying the drift correction signal.

12. The method of claim 1, wherein the phase compensation signal is determined based on a phase response of an algorithm implemented as part of the optical image stabilization process.

13. The method of claim 1, wherein the step of determining the phase compensation signal comprises adjusting a phase response of the drift correction signal to obtain a desired system phase response.

14. The method of claim 1, further comprising obtaining the accelerometer signal for each of at least two orthogonal axes with respect to the portable device.

15. The method of claim 1, further comprising the step of using an evaluation module to determine whether to perform the optical image stabilization-process.

16. The method of claim 15, wherein the evaluation module estimates a drift correction performance and selectively applies the optical image stabilization process when a predetermined performance threshold is satisfied.

17. The method of claim 16, wherein the predetermined performance threshold relates to motion attenuation.

18. A portable device configured to capture one or more images, the portable device comprising:
a camera assembly including a lens;
an accelerometer configured to detect motion of the portable device along at least one axis of motion;
an actuator configured to adjust a position of the lens based on the detected motion;
a processor and a memory containing instructions which when executed by the processor cause the processor to correct for signal drift in an optical image stabilization system of the camera assembly, the processor being programmed to:
obtain from the accelerometer an acceleration signal corresponding to acceleration of the portable device;
remove a gravity component from the accelerometer signal to obtain a proper acceleration signal;
perform a double integration on the proper acceleration signal to obtain a translation signal, the translation signal including a device movement component indicating device movement and a drift component, the drift component representing errors introduced to the translation signal during the double integration due to errors in the acceleration signal from the accelerometer;
estimate the drift component of the translation signal, responsive to obtaining the translation signal;
apply the estimated drift component to generate a drift correction signal such that the drift correction signal can be applied to the translation signal to minimize the drift component of the translation signal and maximize the device movement component of the translation signal;
determine a phase compensation signal of the optical image stabilization system, based on a plurality of phase responses of a plurality of components of the optical image stabilization system; and
apply the translation signal, after correction by the drift correction signal, and the phase compensation signal to an actuator controller which controls movement of the actuator to thereby move the lens within the portable device, such that the translation signal is used to control the correct amplitude of movement of the lens, and the phase compensation signal is used to control the correct timing of the movement of the lens.

19. The device of claim 18, wherein the processor is further programmed to estimate the drift component using curve fitting of the obtained translation signal, wherein the curve fitting is performed for at least two orthogonal axes and uses a predetermined time window or a plurality of overlapping time windows.

20. The device of claim 18, wherein the processor is further programmed to subtract the drift correction signal from the translation signal.

21. The device of claim 18, wherein the processor is further programmed to estimate the drift component responsive to a trigger signal, wherein the trigger signal indicates at least one of a user input, a start of a camera application of a mobile phone, or a start of an image capture.

22. The device of claim 18, wherein the plurality of phase responses include at least one of a phase response of the actuator, a phase response of the accelerometer, and a phase response based on the drift correction signal.

23. The device of claim 18, wherein the phase compensation signal is determined based on a phase response of an algorithm implemented as part of the optical image stabilization system and wherein the processor is further programmed to adjust a phase response of the drift correction signal to obtain a desired system phase response.

24. The device of claim 18, wherein the processor is further programmed to determine whether to activate the optical image stabilization system based on estimating a drift correction performance and selectively activate the optical image stabilization system when a predetermined performance threshold relating to motion attenuation is satisfied.

25. A motion processing unit in a portable device, the motion processing unit comprising:
an accelerometer configured to detect motion of the portable device along at least one axis of motion;
a processor and a memory containing instructions which when executed by the processor cause the processor to correct for signal drift of the motion processing unit, the processor being programmed to:
obtain from the accelerometer an acceleration signal corresponding to acceleration of the portable device;
remove a gravity component from the accelerometer signal to obtain a proper acceleration signal;
perform a double integration on the proper acceleration signal to obtain a translation signal, the translation signal including a device movement component indicating device movement and a drift component, the drift component representing errors introduced to the translation signal during the double integration due to errors in the acceleration signal from the accelerometer;
estimate the drift component of the translation signal, responsive to obtaining the translation signal;
apply the estimated drift component to generate a drift correction signal such that the drift correction signal can be applied to the translation signal to minimize the drift component of the translation signal and maximize the device movement component of the translation signal;
subtract the drift correction signal from the translation signal to generate a corrected translation signal; and
output the corrected translation signal representing translation of the portable device.

26. The motion processing unit of claim 25, wherein the processor is further programmed to estimate the drift component using curve fitting of the obtained translation signal, wherein the curve fitting is performed using a predetermined time window or a plurality of overlapping time windows.

27. The motion processing unit of claim 25, wherein the processor is further programmed to determine a phase compensation signal based on a plurality of phase responses of a plurality of components of the portable device, and apply the phase compensation signal to the output of the corrected translation signal.

28. The motion processing unit of claim 25, wherein the processor is further programmed to estimate the drift component responsive to a trigger signal, wherein the trigger signal indicates at least one of a user input, and a start of an application associated with the portable device.

29. The motion processing unit of claim 25, further comprising an actuator controller configured to control a position of a component of the portable device based on the corrected translation signal.

* * * * *